United States Patent [19]

Gottlieb

[11] 3,998,649

[45] Dec. 21, 1976

[54] PROCESS OF MANUFACTURING PORTLAND CEMENT CLINKER

[75] Inventor: Steven Gottlieb, East Hawthorn, Australia

[73] Assignee: Gorresens Inc., Chicago, Ill.

[22] Filed: Sept. 23, 1974

[21] Appl. No.: 508,428

[52] U.S. Cl. .............................................. 106/100
[51] Int. Cl.² ......................................... C04B 7/44
[58] Field of Search ................................... 106/100

[56] References Cited

UNITED STATES PATENTS 3,402,225   9/1968   Cameron et al. .................. 106/100
3,498,594   3/1970   Rikhof .............................. 106/100

*Primary Examiner*—J. Poer
*Attorney, Agent, or Firm*—Wegner, Stellman, McCord, Wiles & Wood

[57] ABSTRACT

Portland cement raw material components completely calcined before being sintered in a rotary kiln by blending clay and limestone to high and low calcium blends and feeding each blend through separate vertical calciners into which heat is directed from above in counter-current to an updraught of air.

3 Claims, 1 Drawing Figure

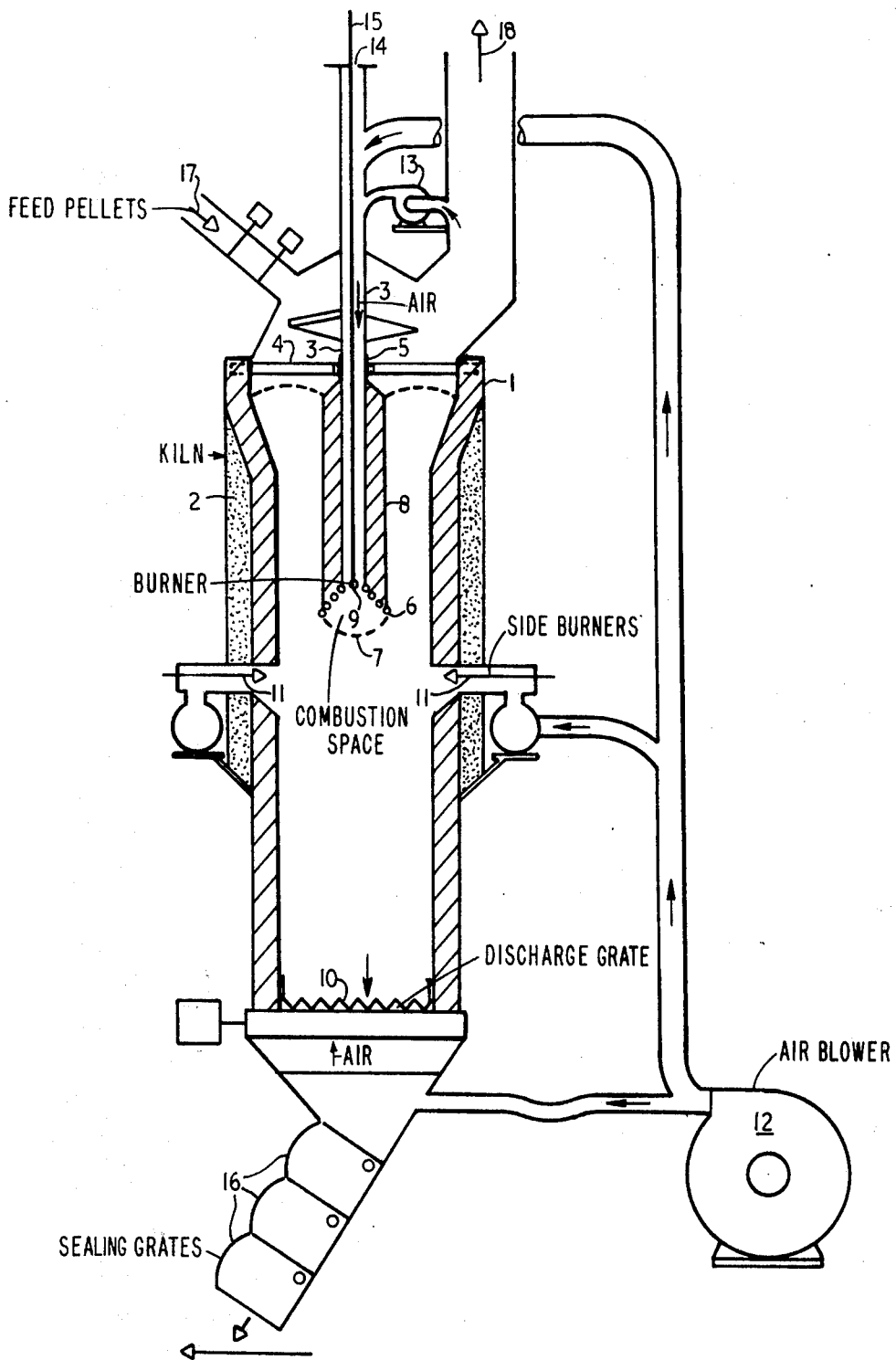

PROCESS OF MANUFACTURING PORTLAND CEMENT CLINKER

This invention relates to an improved process of manufacturing portland cement clinker.

The principal raw material components for the manufacture of cement clinker are in most cases limestone and clay. In the first stage of their processing they must be crushed, ground and homogenized, to yield a blend of acceptable chemical composition, uniformity and fineness.

In the second stage the fine raw material blend thus achieved, must be heated up to a sufficiently high temperature to cause decomposition of the calcium and magnesium carbonates and sintering to clinker.

In the third stage the clinker is ground to finished cement, and gypsum is added to achieve desired setting characteristics.

Two of the above referred three processing stages incorporate several shortcomings, viz:

1. As the clay occurs in most cases in wet, sticky form, its handling and crushing may be difficult and costly. Wet process preparation may overcome most of the difficulties, however the water used for wet preparation must be evaporated in the kiln at substantial fuel cost.

2. In the second stage heat is required for the decomposition of the calcium and magnesium carbonates - to convert the carbonates to oxides the amount of heat needed is approximately 425 kcal p.kg clinker. Additional heat is required to replace the amount of sensible heat lost by external radiation and in exit gases and exit product. However, after the material temperature is further increased to the point of sintering - approximately 100 kcal p.kg clinker is recouped by exothermic reaction.

To perform the complete second stage, i.e., calcining and sintering, in a conventional cement kiln, involves a great deal of thermal inefficiency due to the nature of heat transfer. Only about one fifth of the cross-sectional area of a rotary kiln is filled up by the slowly forward rolling material. Heat is transferred by the flame to the relatively small surface presented by the material mainly by radiation, which varies directly with the absolute temperature raised to the fourth power, thus a very large amount of surplus heat at high temperature remains in the gases after the raw material has become clinker in the hot zone. To recapture at least part of this surplus heat, rotary kilns must be built very long - or coupled with convective heat exchanger systems, which are capable of operation up to 1000° C in order to reduce their length.

It is known to improve the heat efficiency of cement making rotary kilns by attaching heat exchangers to the feed end of the kiln, thus making use of convective heat transfer, with the application of chains, crosses and other devices to utilize the residual heat in the kiln gases. In recent years such heat exchangers have been designed as independent heat transfer units through which the flue gases from the kiln are forced to pass. It is also known to recapture residual heat in the kiln gases by using the raw materials in pelletized form. Only recently however, when the heat exchangers have been extended with separately fired fluid bed or flash furnace heaters has calcination occurred to any extent outside of the kiln.

The object of the invention is to improve the efficiency, in particular the thermal efficiency, and increase the productive capacity of rotary kiln installations. The invention involves completing the endothermic calcination process on two pre-crushed raw material blends in two counter-current air/gas flow vertical kilns, proportioning the two calcined blends into a mill and grinding the mixed blend into a powder of uniform chemical composition and fineness suitable as a feed for a rotary kiln.

Some of the advantages of the process of the present invention are as follows:

1. For relatively low capital cost the capacity of rotary kilns, used for the exothermic sintering only, can be more than doubled.

2. Wet, sticky clays can be used as raw material components in conjunction with limestone, without any drying.

3. Removal of the bulk of alkalies in the two vertical kilns during calcination means that practically alkali-free material is fed into the rotary kiln.

4. Calcination and sintering may be performed in different localities as the weight ratio of 1:1 between calcined constituents and clinker permits economical transportation in bulk.

Broadly in accordance with the present invention there is provided a process for the calcination of portland cement raw material components which comprises blending clay and limestone in a single stage crusher to high and low calcium blends, feeding each blend downwardly through separate vertical calciners, drawing air upwardly through each calciner and feeding heat into the calciners directed downwardly counter-current to the air flow, the heat being introduced under controlled conditions whereby substantially complete calcination of the raw materials is effected.

The following description is of a particular embodiment as illustratively shown in the accompanying drawing. Limestone and clay or shale, dumped on the apron feeder of a non-clog crusher such as a hammermill to yield somewhat higher (a) and lower (b) lime-containing blends reduced to minus 1 inch size, are proportioned separately into two identical counter-current air/gas flow vertical kilns and, being identical, only one is shown in the drawing. Each kiln has a shell (1) lined with firebricks and insulating bricks (2). An iron pipe (3) is held in position by steel structure (4) bolted to the kiln shell and adjustable by sleeve (5). Air pipe (3) is extended by bell (6) made up of wound steel pipes of ¼ 1 inch diameter welded into a solid structure which provides a combustion space aided by the natural angle of repose (7) of material underneath the bell, and also support for the firebrick cover (8) surrounding air pipe (3). A burner nozzle (9) designed for either gas or oil sits in the neck of the bell (6) which burns only part of the fuel with the air flowing downward through pipe (3), the bulk of the fuel being ignited by the air flowing upward through the discharge grate (10). Additional to the fuel burnt by the center burner (9) six circumferentially placed burners (11) firing horizontally into the perimeter of the kiln complete the heat supply necessary to perform full calcination of the materials. Blower (12) provides air for the primary and circumferential burners, as well as for the main airstream flowing upward into the kiln. A small flue gas recirculation fan (13) provides facility to admix flue gas into the air streams feeding the central and circumferential burners, to temper the flame if so required. Observation window (14) serves to observe the flame, oil or gas pipe (15) connects to the fuel source, measuring devices, pump, atomizing etc. In the circularly wound steel pipes of bell (6) water circulates at 5 atm pressure; at an inlet water temperature of about 15° C the outlet temperature will be between 55° C – 65° C with calcining temperature of 1200° C maintained in the hot zone of the kiln. As the temperature of the exit water moves proportionally with fluctuations of hot zone temperature in the kiln, electrical interlocks between grate speed and exit water temperature will assure uniform temperature in the hot zone. The feed inlet is shown at 17 whilst 18 indicates a flue gas outlet to dust collector and alkali precipitator (not shown). The calcined material is discharged by grate (10), shown on the drawing as a reciprocating grate made up of carrier unit on which wear resistant castings, forming 4 × 4 inch square openings with excenter crown in the centre, are laid out, though other types of grates may also be used for this application. The calcined blends pass through alternating triple sealing gates (16) which feed by separate conveyor from each kiln into two hoppers, containing calcined (a) and (b) blends which proportion into an automatically sampled and analysed mill (not shown), to feed a rotary kiln.

In the two vertical kilns the counter-current air/gas flows at high velocities and turbulencies ensure an excellent rate of heat transfer, thus calcination, which is the main heat consumer prior to the formation of cement clinker, is performed at a high degree of efficiency. Feeding with precalcined and ground powder, the rotary kiln will be required to heat it up to the temperature required for sintering, at which level it will obtain an exothermic bonus of about 100 kcal p.kg. clinker. Notwithstanding thermal losses by radiation and sensible heat left in clinker and exit gases, heat requirement for the rotary kiln will be much less than for normal operation which permits better utilization of the rotary kiln cross sectional area for material flow and also higher speed of this flow, resulting in more than doubling its output.

I claim:

1. A process for the calcination of portland cement raw material components which comprises blending two separate mixes of clay and limestone each in a single stage crusher to provide separate high and low calcium content blends, feeding each said separate blend downwardly through correspondingly separate vertical calciners, drawing air upwardly through each said separate calciner and applying heat into both said calciners downwardly and countercurrently to the air flow, said applying of the heat being sufficient for substantially complete calcination of said blends, and mixing said completely calcined blends.

2. A process as claimed in claim 1 wherein said downwardly directed heat is supplemented by heat introduced into the calciners horizontally through side openings by circumferentially placed burners.

3. A process as claimed in claim 1 wherein said downwardly directed heat is provided from a gas or oil burner situated in a combustion chamber formed from a bell-shaped extension of an axially located air and fuel inlet pipe, the bell-shaped extension comprising windings of pipe through which water is circulated under pressure.

* * * * *